INVENTOR
CORNELIS VAN DER LELY

United States Patent Office 3,158,979
Patented Dec. 1, 1964

3,158,979
AGRICULTURAL IMPLEMENTS FOR WORKING MATERIAL LYING ON THE GROUND
Cornelis van der Lely, Zug, Switzerland, assignor to Patent Concern N.V., Willemstad, Curacao, Netherlands Antilles, a limited-liability company of the Netherlands Antilles
Filed July 26, 1960, Ser. No. 45,334
Claims priority, application Netherlands Aug. 6, 1959
12 Claims. (Cl. 56—370)

This invention relates to agricultural implements for working material lying on the ground such as cut crops or the like.

In accordance with the invention there is provided an implement for working material lying on the ground, comprising a frame supporting first and second arrays of tools adapted to perform similar working operations upon the said material, wherein the arrangement is such that the implement is operable in a first working position in which material worked by the first array is subsequently worked by the second array, or in a second working position in which only the said second array works the material.

For a better understanding of the invention, and to show how the same may be carried into effect, reference will now be made, by way of example, to the accompanying drawings, in which.

Figure 1:
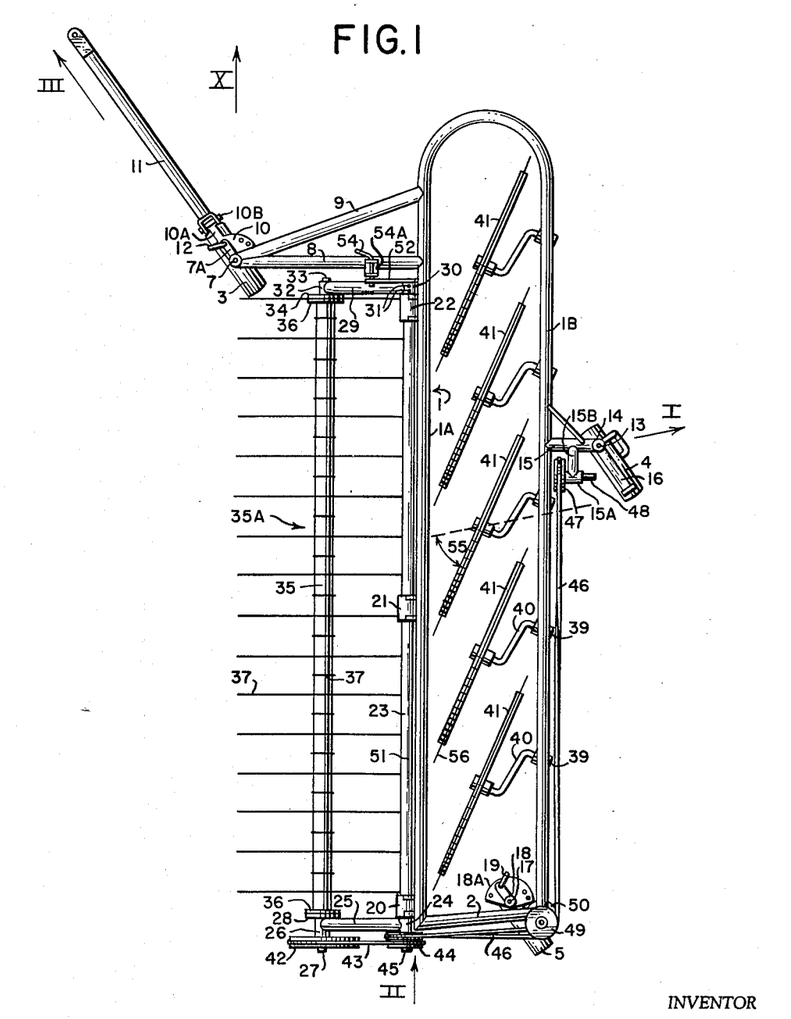
FIGURE 1 is a plan view of an implement in accordance with the invention.
Figure 2:
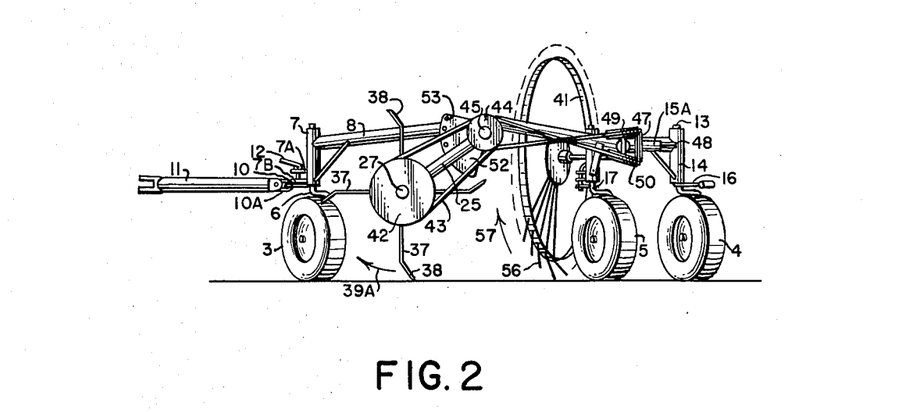
FIGURE 2 is a side view of the same implement taken in the direction of the arrow II of FIGURE 1.

Referring to the drawings, the implement shown in FIGURES 1 and 2 comprises a frame having U-shaped main frame beam 1, the ends of the limbs 1A or 1B of the U being connected to one another by means of a further frame beam 2. The frame is supported by three ground-engaging wheels 3, 4 and 5, the wheels 4 and 5 being caster wheels. The frame also includes two frame beams 8 and 9 which project from one of the limbs of the U of the main frame beam 1 close to the bend of the U and, at their point of intersection, a vertical bearing 7 is provided within which a rod 6 is turnably mounted, the lower end of the rod 6 carrying the ground wheel 3. Thus, the plane of rotation of the ground wheel 3 is turnable about the longitudinal axis of the vertical bearing 7. A sector plate 10 is rigidly secured to the rod 6 and is formed with a number of holes any one of which can be brought into alignment with the holes in two vertically spaced lugs 7A and 7B rigidly secured to the vertical bearing 7. A locking pin 12 is provided which can be passed through the holes in the lugs 7A and 7B into any one of the holes in the sector plate 10 to lock the plane of rotation of the ground wheel 3 in a desired angular setting relative to the frame of the implement. The sector plate 10 has an extension 10A provided with a horizontally disposed pivot pin 10B to which a drawbar 11 can be attached in such a way that it is turnable about the said pivot pin in vertical directions.

The ground wheel 4 is carried by a rod 13 turnably received in a vertical bearing 14 which is secured to an arm 15 projecting from the opposite limb of the main frame beam 1 to that which carries the frame beam 8 and 9. A coupling member 16 including a horizontal pivot pin similar to that carried by the extension 10A is rigidly secured to the rod 13 and the draw-bar 11 can be disengaged from the extension 10A and connected to the coupling member 16 when required. The ground wheel 5 is rotatably mounted at the lower end of the rod 17 which latter is turnably received in a vertical bearing 18 secured to the side of the frame beam 2, a locking pin 19 co-operating with a sector plate 18A attached to the rod 17 in a similar manner and for the same purpose as that described in connection with the ground wheel 3.

The limb of the main frame beam 1 to which the frame beams 8 and 9 are secured is also provided with three horizontal bearings 20, 21 and 22 within which an axle 23 is rotatably received, the axle 23 affording a substantially horizontal axis 51. The end 24 of the axle 23 adjacent to the frame beam 2 has an arm 25 perpendicularly secured to it, the end of the arm 25 remote from the axle 23 carrying a horizontal bearing 26 in which is journalled a stub shaft 27. The other end of the axle 23 carries an arm 29, similar to the arm 25, and similarly provided with a horizontal bearing 32 in which a stub shaft 33 is rotatably journalled. However, the arm 29 is releasably attached to the axle 23 by means of a sleeve 30, two pins 31 being received in transverse bores in the end of the axle 23 and in the surrounding sleeve 30 to maintain the axle 23 and the arm 29 rigid with one another. The stub shaft 27 is provided with a flange 28 and the co-axial stub shaft 33 is provided with a similar flange 34. A shaft 35 is secured between the flanges 28 and 34 by means of co-operating flanges 36 which it has at both ends. The two flanges 36 are secured to the flanges 28 and 34 respectively in any convenient known manner, such as by the use of nuts and bolts or the like. The shaft 35 is provided wtih a plurality of crop-working tools in the form of tines 37 and thus forms a first crop-working array 35A. The tines 37 are arranged at 90° to one another in co-planar groups of four, the corresponding tines in each group extending in longitudinal rows. Each tine 37 is disposed radially with respect to the shaft 35 over the greater part of its length but its free end or tip 38 (FIGURE 2) is inclined rearwardly with respect to the intended direction of rotation 39A of the shaft 35.

The main frame beam 1 is provided with five horizontal bearings disposed on the other limb of the U from that provided with the horizontal bearings 20 to 22, each of the bearings 39 turnably supporting one end of a crank 40, the other end of which carries a rotatably mounted rake wheel 41. The rake wheels 41 are arranged in a single row which extends parallel to the shaft 35 and which is capable of working a strip of land of substantially the same width as that which can be worked by the first array 35A. The bearings 39 and cranks 40 are arranged in such a way that, in plan view, the rake wheels 41 all lie within an area bounded by the main frame beam 1 and the frame beam 2 (see FIGURE 1). The tines of the five rake wheels 41 together constitute a second array of crop-working tools.

The rake wheels 41 are adapted to be rotated, during operation of the implement, by virtue of their contact with the ground or with material lying thereon or both. The first array 35A, on the other hand, is adapted to be rotated during operation of the implement by the power take-off of the tractor or the like which is used to propel the implement. A pulley 42 is rigidly mounted on the end of the stub axle 27 remote from the flange 28 and a rope 43 connects this pulley with one part of a two-part pulley 44 rotatably mounted on a stub shaft 45 rigid with the end 24 of the axle 23 and co-axial with the aforementioned horizontal axis 51. The other part of the two-part pulley 44 is connected by means of a rope 46 to a pulley 47 carried by a splined or keyed shaft 48 rotatably mounted in a horizontal bearing 15A attached to the arm 15 by means of a further arm 15B. The rope 46 is guided through approximately 90° by means of upper and lower horizontally disposed guide pulleys 49 and 50 mounted close to the connection of the frame beam 2 with one of the limbs of the main frame beam 1.

As previously stated, the axle 23 is turnable about its horizontal axis 51 in the bearings 20, 21 and 22. It will be appreciated that the arms 25 and 29 are turnable with the axle 23, a turning movement acting to raise or lower the array 35A with respect to the frame. In order to be able to lock the array 35A in a desired height relationship with the frame of the implement, and thus with the ground, the arm 29 has a sector plate 52 secured to it, the sector plate 52 being provided around its periphery with a number of holes 53, in any aligned one of which the end of a locking pin 54 can engage. The locking pin 54 is axially slidable in a bracket 54A rigidly secured to the frame beam 8. Due to the fact that the stub shaft 45 is coaxial with the horizontal axis 51, no alteration will take place in the tension in the rope 43 when the axle 23 is turned about the said horizontal axis 51 and thus no interruption will be caused to the drive from the tractor or the like to the array 35A.

The implement may be used in a first working position in which crop or like material lying on the ground is to be turned to promote the drying thereof. In this first working position, the implement is propelled in the direction indicated by the arrow I, the draw-bar 11 being used to connect the coupling member 16 with a tractor or the like and the shaft 48 being coupled with the power take-off of the tractor or the like in any convenient known manner. The ground wheels 3 and 5 are locked in suitable angular settings by means of the pins 12 and 19 whereas the setting of the ground wheel 4 is dependent upon changes in the direction I. In this working position, the implement acts as a tedder with the second array of rake wheels 41 in front of the first array 35A viewed in the direction of travel I. The two crop-working arrays thus both work the same strip of land, the rake wheels 41 displacing the material laterally of the direction of travel into the path of the tines 37 carried by the shaft 35. Each rake wheel 41 is rotated in a direction indicated by the arrow 57 due to its contact with the ground or with material lying thereon or both and has a plurality of tines whose tips 56 are inclined rearwardly with respect to the direction of rotation 57 in order that crop or the like shall become automatically disengaged therefrom while they are moving upwardly as shown in FIGURE 2. Each rake wheel is inclined to the direction of travel I at an angle 55 of about 55°. The rake wheels 41 act substantially to loosen the crop or the like while they ted it into the path of the tines 37 which latter lie in planes inclined at about 10° to the direction I. This allows the tines 37 to ted and turn the loosened crop or the like in a very satisfactory manner, the crop or the like being left well dispersed on the land so that the further drying thereof is greatly facilitated. Since the crop or the like has already been substantially loosened by the rake wheels 41 before it is engaged by the tines 37, the whole of the array 35A may be of light construction. In addition the speed of rotation of the shaft 35 need not be great, thus reducing the rate of wear of the moving parts.

The implement may alternatively be used in a second working position in which a tractor or the like propels the implement in the direction indicated by the arrow III in FIGURE 1 by means of the draw bar 11. The array 35A is not used in the second working position and is maintained well clear of the ground by engaging the locking pin 54 in an appropriate one of the holes 53 in the sector plate 52. Thus, the rake wheels 41 alone work the crop or the like and the implement acts as a side delivery rake, each rake wheel 41 displacing crop of the like laterally into the path of the rake wheel next behind it, viewed in the direction of travel, and all the crop or the like being delivered to the side of the rearmost rake wheel in the row. The rake wheels are turned in the same direction as in the first working position but, in this case, the crop or the like is engaged by the opposite side of the plane of rotation of each rake wheel 41. In this working position of the implement, the ground wheel 4 is arranged so that its plane of rotation can turn freely about the vertical bearing 14 whereas the angular setting of the ground wheel 5 is fixed in substantially the position shown in FIGURE 1 by means of the locking pin 19. The wheel 3 is connected with the draw-bar 11 and acts as a steering wheel.

When it is desired to move the implement from one place to another without performing any working operation, it is desirable that the implement should have as narrow an overall width as possible in order to facilitate its negotiation of gateways, public roads and the like. This is achieved by propelling the implement in the direction indicated by the arrow X, the locking pin 19 being engaged in a suitable one of the holes in the sector plate in order to maintain the plane of rotation of the ground wheel 5 parallel to the shaft 35 and to the row of rake wheels 41. The ground wheel 4 is arranged so that its plane of rotation is freely turnable about the corresponding vertical bearing. The first array 35A is maintained clear of the ground by engaging the locking pin 54 in a suitable one of the holes 53 and the second array of rake wheels 41 is similarly maintained clear of the ground by lifting means which, for the sake of simplicity, are not shown in the drawings.

Figure 3:
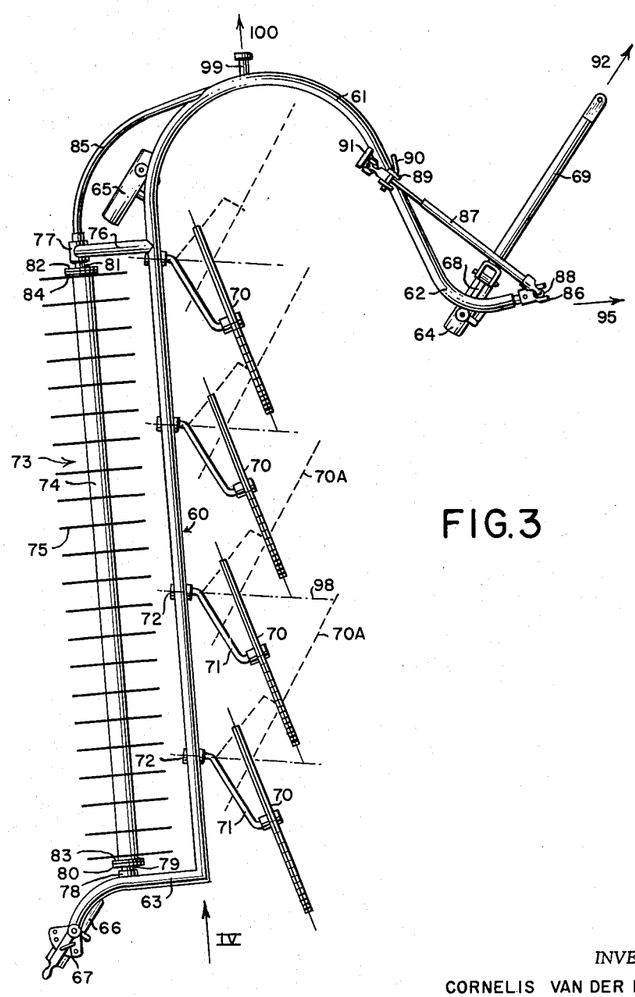
FIGURE 3 is a plan view of a second embodiment of an implement in accordance with the invention.
Figure 4:
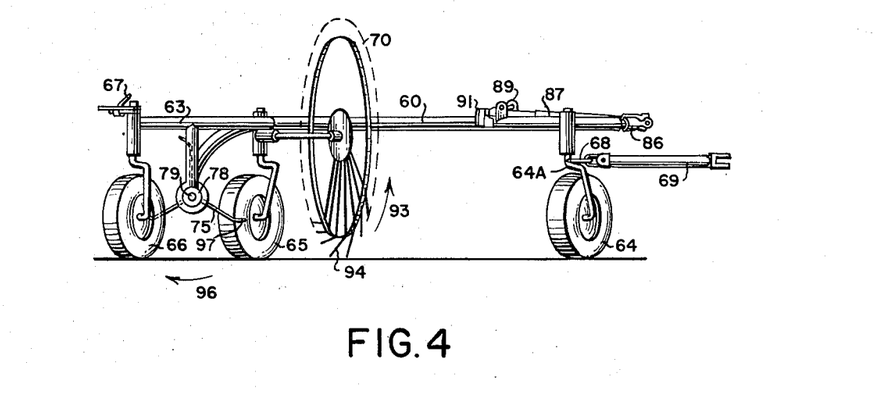
FIGURE 4 is a side view of the same implement taken in the direction of the arrow IV of FIGURE 3.

FIGURES 3 and 4 show a second embodiment of an implement in accordance with the invention, the implement comprising a frame having a main frame beam 60 provided at one end with two oppositely curved portions 61 and 62 and having two further frame beams 63 and 76 projecting perpendicularly from it, the frame beam 63 being curved towards the end remote from its connection with the main frame beam 60. The frame is supported on the ground by three ground-engaging wheels 64, 65 and 66 of which the ground wheels 64 and 65 are caster wheels. The supporting rod 64A of the ground wheel 64 is provided with a coupling member 68 to which a draw bar 69 can be attached so as to be movable in vertical directions in a manner similar to that described in respect of the draw-bar 11. Means including a locking pin 67 are provided for setting the plane of rotation of the ground wheel 66 in a desired position of angular adjustment relative to the frame of the implement.

The arm 63 supports a horizontal bearing 78 in which a stub shaft 79 having a flange 80 is journalled. The arm 76 similarly supports a horizontal bearing 77 in which a stub shaft 81 having a flange 82 is journalled. A shaft 74 having a flange 83 at one end and a flange 84 at the other end is secured between the two flanges 80 and 82 by any suitable known means such as nuts and bolts. The shaft 74 is provided with a plurality of longitudinally extending rows of tines 75 arranged in co-planar groups of three and thus constitutes a first array of crop-working tools 73. Each tine 75 has its tip 97 inclined rearwardly with respect to the direction of rotation 96 of the shaft 74 and each tine is inclined at an angle of approximately 120° to its neighbors in the same group. The main frame beam 60 is provided with four horizontal bearings 72 each of which rotatably receives one end of a crank 71, the other end of which rotatably supports a tined rake wheel 70. The four rake wheels 70 lie parallel to one another in a row and together constitute a second array of crop-working tools. As in the case of the first embodiment, the row of rake wheels 70 is substantially parallel to the shaft 74 and is adapted to work a strip of land of approximately the same width as that worked by the assembly 73.

The shaft 74 is adapted to be rotated during operation of the implement by means of the power take-off of a tractor or the like. A flexible drive 85 has one of its ends connected to the stub shaft 81 at the horizontal bearing 77, its other end being provided with a universal joint 86 and the majority of its length being received within the curved tubular parts 61 and 62 of the frame. The universal joint 86 is connected to one end of a telescopic driving shaft 87 whose other end can be coupled to the power take-off of the tractor or the like. When it is desired not to use the assembly 73, the telescopic shaft 87 can be turned about one of the pivot pins 88 of the universal joint 86 into the locked position shown in FIGURES 3 and 4 of the drawings in which the two parts of the universal joint are disposed at an angle of approximately 50° to one another. The free end of the telescopic driving shaft 87 is then received between the two cheeks of a bracket 89 secured to the frame of the implement, a securing pin 90 being inserted in aligned holes in the cheeks of the bracket 89 to prevent the shaft 87 from becoming dislodged therefrom. When in this position, the extreme free end of the telescopic driving shaft 87 abuts against a stop 91 secured to the frame of the implement in order to prevent undesired telescopic extension thereof. The locking is effected by engaging the driving shaft 87 in the bracket 89 since, when the driving shaft 87 is in this position, the flexible drive 85 is locked against rotation due to the relative inclination of less than 125° between the two halves of the universal joint 86.

The implement can be used in a first working position in which it is drawn in the direction indicated by the arrow 95 by a tractor or the like attached to the draw bar 69, the ground wheel 66 being locked in a corresponding angular setting. The telescopic driving shaft 87 is connected to the power take-off of the tractor or the like to operate the first array 73, the driving shaft 87 then being disposed substantially parallel to the adjacent end of the flexible drive 85. The rake wheels 70 are disposed in the positions 70A indicated in broken lines in FIGURE 3, this position being obtained by turning each crank 71 through approximately 180° about the horizontal axis 98 afforded by its connection with the corresponding horizontal bearing 72. The rake wheels 70 rotate in the direction indicated by the arrow 93 in FIGURE 4, the tips 94 of their tines being inclined rearwardly with respect to this direction. As in the case of the first embodiment, the rake wheels 70 each loosen crop or the like lying on the ground and ted it into the path of the tines 75 of the assembly 73. The loosened crop or the like is then engaged by the tines 75 and further agitated so that it is left lying on the land in a well dispersed manner which is conducive to the further drying thereof. The tines 75 lie in planes which extend substantially parallel to the direction I.

The implement can be used in a second working position in which the first array 73 does not take part. This is accomplished merely by turning the shaft 74 into a position in which the tines 75 are disposed as shown in FIGURE 4 of the drawings, this position corresponding to the locked position of the universal joint 86. Due to the 120° clearance between neighboring tines, the lowermost tines are sufficiently clear of the ground to prevent their tips 94 contacting the crop or the like lying thereon. The implement is drawn in the direction indicated by the arrow 92, the ground wheel 66 again being locked in a corresponding angular setting. The rake wheels are disposed in the positions indicated in full lines. The implement constitutes a side delivery rake in the position described, the rake wheels turning in the same direction as when they are disposed in the first working position and the crop or the like being engaged by the same sides of their planes of rotation. Since the implement acts as a side delivery rake, the crop is, in fact, all laterally displaced to a position out of the path of travel of the array 73 so that even if a particularly high windrow or the like should be formed, it will not be fouled by the array 73.

When it is desired to move the implement from one place to another without any working operation being performed, the draw bar 69 is attached to a coupling member 99 projecting from the curved part 61 of the frame of the implement and the implement is moved in the direction indicated by the arrow 100, its overall width being a minimum in this position. The shaft 74 is locked in a position such that the tines 75 are disposed as shown in FIGURE 4. The ground wheel 66 is locked in an angular setting corresponding to the direction 100 and the rake wheels 70 are raised clear of the ground by means which, for the sake of clarity, are not shown in the drawings.

FIGURES 5 to 9 show a third embodiment of an implement in accordance with the invention, the implement comprising a frame having two separate portions indicated generally by the references 101 and 102. The portions 101 and 102 are pivoted to one another, the portion 101 including a bent frame beam 103 to the opposite ends of which two vertical bearings 104 and 105 are secured and the portion 102 being formed principally by an inclined frame beam 131 to the lower end of which a vertical bearing 135 is secured. Vertically disposed rods 108 are turnably mounted in the two vertical bearings 104 and 105 and respectively carry ground-engaging wheels 106 and 107 at their lower ends. The plane of rotation of the ground-engaging wheel 106 can be secured in a desired angular setting by means of a locking pin 109 which can be engaged in any one of a number of holes in a sector plate 105A in a similar manner to the locking arrangement described in respect of the ground wheel 3 of the first embodiment. The ground wheel 107 is provided with a substantially identical locking arrangement and its supporting rod 108 is, in addition, provided with a coupling member 110 to which a draw bar 139 can be attached so as to be movable relative thereto in vertical directions.

Figure 5:
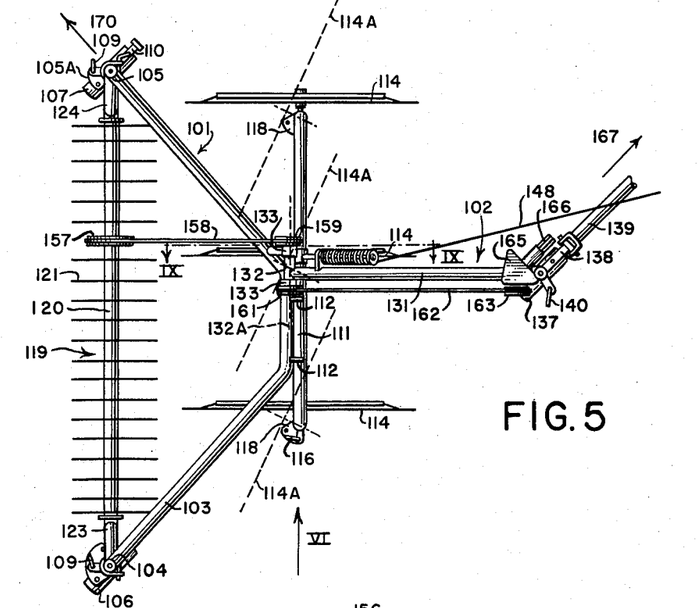
FIGURE 5 is a plan view of a third embodiment of an implement in accordance with the invention.
Figure 6:
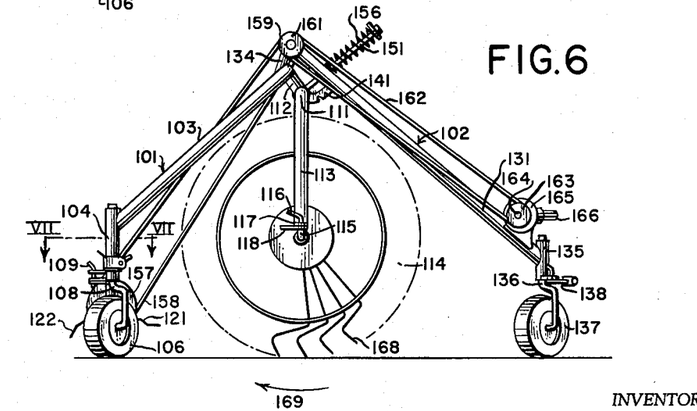
FIGURE 6 is a side view of the same implement taken in the direction of the arrow VI of FIGURE 5.
Figures 7, 8:
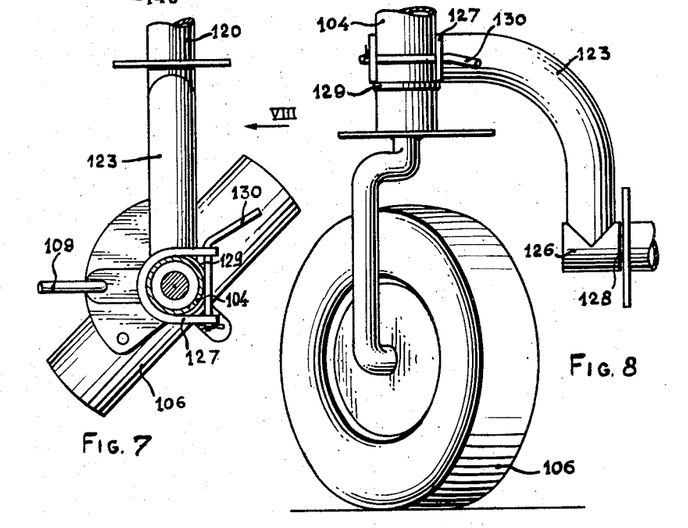
FIGURE 7 is a section, to an enlarged scale, taken on the line VII—VII of FIGURE 6.
FIGURE 8 is a view taken in the direction of the arrow VIII of FIGURE 7.

The frame portion 101 also includes a horizontal frame beam 111 which is secured to the frame beam 103 by means of lugs 112. Three vertical frame beams 113 project downwardly at different locations along the frame beam 111, each frame beam 113 having a rotatable but axially immovable rod 115 journalled in its lower end and each rod 115 rotatably supporting a corresponding rake wheel 114 having a number of tines whose tips 168 are rearwardly inclined with respect to the intended direction of rotation of the rake wheel. The three tined rake wheels 114 together constitute a second array of crop-working tools. The plane of rotation of each rake wheel 114 can be angularly adjusted by turning the corresponding rod 115 in the end of the frame beam 113 and can be locked in at least two different angular settings by means of a locking pin 116 which co-operates with a hole in a lug 117 rigid with the frame beam 113 and with any one of at least two holes formed in a sector plate 118 rigid with the rod 115.

The frame portion 101 also supports a first array of crop-working tools 119 which is very similar in construction to the array 73 described in connection with the second embodiment and which includes a plurality of tines 121 arranged in three rows with each tine spaced at approximately 120° from its neighbor. Each tine 121 has a tip 122 which is inclined rearwardly with respect to the direction of rotation of the shaft 120. In order that the array 119 should be capable of being quickly and easily removed from the implement or reconnected thereto, it is supported by two curved arms 123 and 124, the arrangement of the arm 123 being shown in greater detail in FIGURES 7 and 8 of the drawings. The lower end of the curved arm 123 is formed as a horizontal bearing 126 in which is received one end 128 of the shaft 120, the upper end of the arm 123 being formed as a U-shaped forked bracket 127 which engages around the lower end of the vertical bearing 104 and the side of which abuts against a collar 129 which prevents axial movement of the bearing 104 relative to the bracket 127. The limbs of the U of the bracket 127 are closed around the bearing 104 by a locking pin 130, and it is only necessary to remove the said locking pin 130 to be able to disconnect the bracket 127 from the bearing 104. The curved arm 124 is formed in a similar manner to the arm 123 and thus the array 119 can be readily mounted on or removed from the implement merely by inserting or removing both the two locking pins 130.

The second portion of the frame 102 includes a short horizontally disposed frame beam 132 which is arranged in a T-relationship with the frame beam 131, the latter constituting the upright of the T. The two ends of the frame beam 132 are each journalled in a corresponding horizontal bearing 133, the two bearings 133 being rigidly connected to the frame beam 103 of the first portion of the frame by means of lugs 134, the frame beam 132 thus affording a substantially horizontal axis 132A about which one portion of the frame can pivot relative to the other. The vertical bearing 135 provided at the lower end of the frame beam 131 has a vertical rod 136 journalled therein, the lower end of the rod rotatably supporting a ground-engaging wheel 137. The rod 136 has a coupling member 138 similar to the coupling member 110 secured to it and the rod 136 is provided with a lug forming part of a locking arrangement by means of which the ground wheel 137 can be locked in one angular setting when the coupling member 138 is in register with the aforementioned lug and a locking pin 140 is inserted through aligned holes in the registering members.

Figure 9:
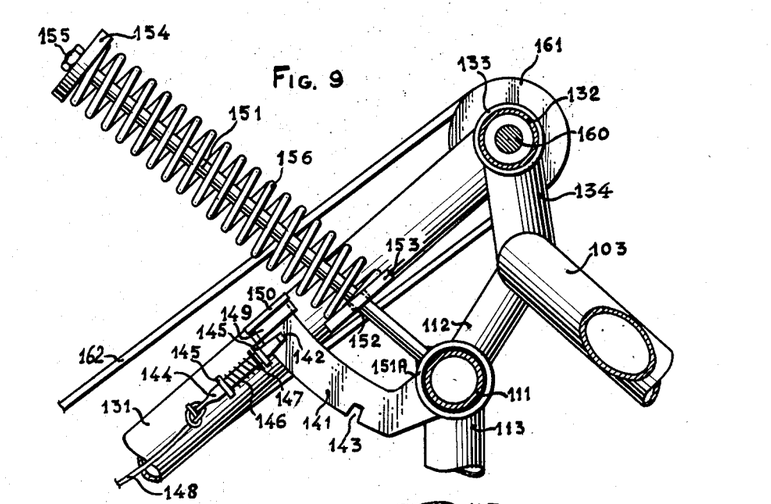
FIGURE 9 is a section, to an enlarged scale, taken on the line IX—IX of FIGURE 5.

In order to be able to lock the frame portion 102 in a desired angular relationship with the frame portion 101, a strip 141 is rigidly attached to the frame beam 111 and extends through a staple 149 secured to the side of the frame beam 131, the end of the strip 141 remote from the frame beam 111 being thickened to form a shoulder 150 which cannot pass through the said staple 149 (FIGURE 9). The strip 141 is formed with two similar notches 142 and 143 in either one of which a locking pin 144 can engage. The locking pin 144 is slidably mounted in holes in two lugs 145 projecting from the side of the frame beam 131 and is urged towards the side of the strip 141 in which the two notches are formed by means of a compression spring 146 which is coiled around the pin 144 and which extends between one of the lugs 145 and a collar 147 rigidly attached to the body of the pin 144 in a position between the said two lugs 145. The pin 144 can be withdrawn from the notch 142 or the notch 143 against the loading of the spring 146 by means of a wire or the like 148 secured to the end of the pin 144 and conveniently extending to a location on the tractor or the like which is used to propel the implement so that the driver or operator thereof can effect withdrawal of the pin 144 without dismounting. It will be seen from the drawings that the two portions of the frame will tend to pivot relative to one another about the axis 132A in a direction which brings the said frame beam 132 closer to the ground. This tendency is resisted by a resilient connection between the two frame portions, the resilient connection comprising a coiled compression spring 156 which surrounds a screw-threaded rod 151. One end of the rod 151 projects from a bearing 151A arranged around the frame beam 111, and the other end is provided with a washer 154 adjustable in position by means of a nut 155 and against which one end of the spring 156 bears. The other end of the spring 156 bears against a lug 153 rigidly secured to the side of the frame beam 131, the rod 151 passing freely through a hole in the lug 153. It will be seen that the aforementioned tendency of the two portions of the frame to pivot relative to one another under the action of gravity is resisted by the compression in the spring 156. An equilibrium position is, in fact, obtained in which the pin 144 is urged against the strip 141 at a location between the notches 142 and 143. The two portions of the frame beam can be readily pivoted relative to one another out of the said equilibrium position into a position which is such that the pin 144 lodges itself in either the notch 142 or the notch 143.

The array 119 is adapted to be rotated, during operation of the implement, by means of the power take-off of a tractor or the like. The shaft 120 is accordingly provided with a pulley 157 which is connected to a pulley 159 by means of a rope 158. The pulley 159 is secured to one end of a shaft 160 (FIGURE 9) which is journalled inside the frame beam 132 and whose other end is provided with a pulley 161. The pulley 161 is, in turn, connected to a further pulley 163 by means of a further rope 162. The pulley 163 is secured to a shaft 164 which constitutes the output of a gear box or like transmission 165. The input of the gear box or the like 165 is afforded by a splined or keyed shaft 166 which can be coupled to the power take-off of a tractor or the like in any convenient known manner. Since the axis of the shaft 160 coincides with the aforementioned pivotal axis 132A, the tension in the two ropes 158 and 162 will remain unchanged in all relative angular positions of the two portions of the frame.

The implement can be used in a first working position in which it functions as a tedder by connecting the drawbar 139 to a tractor or the like and propelling the implement in the direction indicated by the arrow 167 in FIGURE 5. The ground wheels 106 and 107 are locked in the parallel angular settings shown in FIGURE 5 whereas the ground wheel 137 acts as the steering wheel, the setting of its plane of rotation being dependent upon the direction of travel 167. The shaft 166 is connected to the power take-off of the tractor or the like and the shaft 120 is driven by means of the ropes and pulleys previously described. The rake wheels 114 are disposed in the position shown in full lines in FIGURES 5 in which their planes of rotation extend perpendicular to the shaft 120. However, the rake wheels are inclined to the direction of travel of the implement 167 and ted crop into the path of the tines 121. The latter are similarly inclined to the direction of travel 167 and thoroughly ted and turn the crop which has already been loosened by the rake wheels 114. The crop is thus left on the land in a well dispersed manner which is conductive to the further drying thereof. As in the previous cases, the row of rake wheels 114 and the array 119 are so positioned relative to the direction of travel 167 that the strip worked by the first array is substantially of the same width as, and substantially coterminus with, the strip worked by the second array.

The implement can also be used in a second working position in which the draw bar 139 is attached to the connecting member 110 and the implement is drawn in the direction indicated by the arrow 170 in FIGURE 5. Both the ground wheels 106 and 137 are locked in corresponding parallel settings, the ground wheel 107 being steered by changes in the direction of travel 170. In the second working position, the implement acts as a side delivery rake, the planes of rotation of the rake wheels 114 being locked in the positions 114A indicated in broken lines in FIGURE 5 by means of the locking pins 116. The rake wheels 114 are rotated in the same direction 169 as in the first working position and the crop is engaged by the same sides of their planes of rotation. In order that the first array 119 shall not foul the crop in the second working position, it may be bodily disconnected from the implement in the manner previously described by removing the locking pins 130 from their operative positions. The rope 158 is disconnected from the pulley 159 and also removed from the implement. When it is desired to move the implement without it performing any working operation, the portions of the frame 101 and 102 are pivoted relative to one another about the horizontal axis 132A into an angular position in which the locking pin 144 engages in the notch 143 and the implement is propelled by a tractor or the like connected to the coupling member 138. In this position the peripheries of the rake wheels 114 are raised well clear of the ground. The array 119, as in the case of the second working position, may be disconnected from the implement and may be transported separately. When the implement is working as a tedder or as a side delivery rake, the pin 144 is engaged in the notch 142 in order to maintain the rake wheels 114 firmly in contact with the ground. However, all that is required to release the pin 144 from the notch 142 and transfer it to the notch 143 when the implement is connected to a tractor, is for the driver of the tractor to pull the wire or the like 148 to retract the pin 144 against the action of its loading spring 146, drive the tractor a short distance backwards, and then release the wire or the like 148 whereupon the pin 144 will automatically engage in the notch 143. A return of the pin 144 to the notch 142 is similarly accomplished by operating the wire or the like 148 and driving the tractor a short distance forward. As previously stated, the spring 156 tends to hold the pin 144 in a position between the notches 142 and 143 so that only a relatively small force need be exerted to accomplish either of the movements just described.

Due to the fact that the frame beams 113 which support the rake wheels 114 are connected to the rest of the frame at a point immediately below the axis 132A, they remain substantially vertically disposed throughout angular adjustments of the portions 101 and 102 relative to one another. If desired, the vertical movement of the frame beams 113 may be used to adjust the vertical heights of the axes of rotation of the rake wheels 114 in either of the two working positions. Furthermore, the rake wheels may be raised in this way to a height which is such that only the array 119 can work the crop or the like, the axis of rotation of the shaft 120 being disposed so close to the ground wheels 106 and 107 that angular adjustments about the axis 132A do not affect its height above the ground to any substantial extent.

Although in the third embodiment the lower end of the frame beam 131 is supported by the ground-engaging wheel 137, it will be appreciated that, in practice, when the implement is being used as a tedder, the frame beam 131 may be connected directly to a tractor or the like, the ground wheel 137 being dispensed with.

In each of the embodiments described, the first array of crop working tools has been mechanically driven by the power take-off of a tractor or the like. However, as an alternative, the said first array may be mechanically connected to a ground-engaging wheel of the implement or may be driven by a small motor or other prime mover provided specifically for that purpose.

What I claim is:

1. A tedding device comprising a frame, a plurality of rotatable laterally spaced raking members supported by said frame in the forward part thereof, said rotatable raking members arranged to rake material obliquely with respect to the line of travel of said device, a plurality of laterally spaced crop working elements rotatably mounted in the after part of said device behind and substantially aligned in the intended direction of travel of said device said plurality of raking members whereby said raking members and said crop working elements operate substantially upon the same strip of ground and serve to ted the crop lying thereon.

2. A device in accordance with claim 1 wherein said rotatable raking members comprise rake wheels and said plurality of rotatable raking members are disposed in echelon, and wherein crop working elements are arranged to rake material substantially parallel to the line of travel of said device.

3. A device in accordance with claim 1 wherein a shaft is mounted in the after part of said frame and wherein said crop working elements comprise a plurality of raking tines extending outwardly from said tines.

4. A device in accordance with claim 1 where motive means is interconnected to said crop working elements to rotate same.

5. A device in accordance with claim 1 wherein there is provided adjustment means in association with said rotatable raking members selectively to change the obliquity thereof.

6. A device in accordance with claim 1 wherein there is provided motive means and cable transmission means, said cable transmission means interconnecting said crop working elements and said motive means, said transmission means embraced through a substantial portion of its length by said frame.

7. A tedding device comprising a frame, first and second coupling members connected to said frame in its forward and after parts respectively for coupling said device to a tractor, a plurality of rotatable rake wheels disposed in echelon and supported by said frame in the forward part thereof, each of said rake wheels arranged obliquely with respect to the line of travel of said device when it is drawn by said first coupling member, crop working elements interconnected to said frame in the after part thereof arranged to rake material substantially parallel to the line of travel of said device when it is drawn by said first coupling member, and disengagement means for said crop working elements, whereby the device functions as a side delivery rake when said implement is drawn by said coupling member and said crop working elements are disengaged.

8. A device as claimed in claim 7 wherein said disengagement means comprises lifting means whereby said crop working elements are lifted above and maintained out of contact with the ground or material lying thereon.

9. A tedding device comprising a frame, a plurality of rotatable raking members supported by said frame in the forward part thereof, said raking members arranged to rake material obliquely with respect to the line of travel of said device, a plurality of crop working elements rotatably mounted in the after part of said device behind said rotatable working members arranged to rake material substantially parallel to the line of travel of said device, whereby said rotatable raking members and said crop working elements operate upon substantially the same strip of ground and serve to ted the crop lying thereon, and securing means connected to the frame and adapted to secure said crop working elements against rotation and in an inoperative position.

10. A tedding device comprising a frame, a plurality of rotatable raking members supported by said frame in the forward part thereof, said rotatable raking members arranged to rake material obliquely with respect to the line of travel of said device, pivotal arms disposed at opposite ends of said frame, a plurality of crop working elements rotatably and releasably mounted by means of said pivotal arms in the after part of said device behind said rotatable raking members arranged to rake material substantially parallel to the line of travel of said device, whereby said rotatable raking members and said crop working elements are adapted to operate upon substantially the same strip of ground and to ted the crop lying thereon.

11. A tedding device comprising a frame, first and second arrays of laterally spaced rotary members supported by said frame, said first array disposed to the rear and aligned substantially with said second array in the intended direction of travel of the device, the raking members of said second array being disposed obliquely relative to the intended direction of travel of said device, the raking members of said first array being disposed substantially parallel to the intended direction of travel of said device, whereby said raking members of said first array and of said second array operate substantially upon the same strip of ground to provide a compound tedding of the crop lying thereupon.

12. A raking device comprising a frame, first and second arrays of laterally spaced rotary raking members supported by said frame, all of said members of said first array disposed behind and aligned substantially with said second array in the intended direction of travel of the device, the raking members of said first array being disposed obliquely to the intended direction of travel of said device, the raking members of said second array also being disposed obliquely relative to the intended direction of travel of said device but at an angle thereto different than said first array, whereby the raking members of said first array and of said second array operate substantially on the same strip of ground and ted at different angle to the intended direction of travel of said device.

References Cited in the file of this patent

UNITED STATES PATENTS

| | | |
|---|---|---|
| 349,928 | Denney | Sept. 28, 1886 |
| 2,675,665 | Tinter et al. | Apr. 20, 1954 |
| 2,683,345 | Meyer | July 13, 1954 |
| 2,827,754 | Hill | Mar. 25, 1958 |
| 2,845,769 | Hintz et al. | Aug. 5, 1958 |

FOREIGN PATENTS

| | | |
|---|---|---|
| 1,104,111 | France | Oct. 7, 1957 |
| 1,203,492 | France | July 27, 1959 |
| 784,306 | Great Britain | Oct. 9, 1952 |
| 793,432 | Great Britain | Apr. 16, 1958 |
| 331,424 | Switzerland | Sept. 15, 1958 |